US011476633B2

(12) United States Patent
Qiu et al.

(10) Patent No.: US 11,476,633 B2
(45) Date of Patent: Oct. 18, 2022

(54) APPARATUS AND METHODS FOR STABLE BIDIRECTIONAL OUTPUT FROM RING LASER GYROSCOPE

(71) Applicant: Honeywell International Inc., Morris Plains, NJ (US)

(72) Inventors: Tiequn Qiu, Glendale, AZ (US); Teresa Marta, White Bear Lake, MN (US); Jianfeng Wu, Tucson, AZ (US)

(73) Assignee: Honeywell International Inc., Charlotte, NC (US)

( * ) Notice: Subject to any disclaimer, the term of this patent is extended or adjusted under 35 U.S.C. 154(b) by 162 days.

(21) Appl. No.: 16/933,537

(22) Filed: Jul. 20, 2020

(65) Prior Publication Data
US 2022/0021177 A1 Jan. 20, 2022

(51) Int. Cl.
*H01S 3/081* (2006.01)
*H01S 3/131* (2006.01)
(Continued)

(52) U.S. Cl.
CPC ............ *H01S 3/1312* (2013.01); *H01S 3/083* (2013.01); *H01S 3/0815* (2013.01); *H01S 3/094* (2013.01); *H01S 3/1305* (2013.01)

(58) Field of Classification Search
CPC ...... H01S 3/1312; H01S 3/0815; H01S 3/083; H01S 3/094; H01S 3/1305; H01S 3/094096; H01S 3/09415; G02F 1/35; G01C 19/661
See application file for complete search history.

(56) References Cited

U.S. PATENT DOCUMENTS 5,363,192 A * 11/1994 Diels ...................... G01C 19/66
372/94
6,650,682 B1 11/2003 Diels et al.
(Continued)

FOREIGN PATENT DOCUMENTS

CN 204517135 U 7/2015

OTHER PUBLICATIONS

Rabeendran, "New Approaches to Gyroscopic Lasers", A These Submitted in Partial Fulfilment of the Requirements for the Degree of PHD in Physics in the University of Canterbury, Oct. 2013, pp. 1 through 162, University of Canterbury.
(Continued)

*Primary Examiner* — Xinning(Tom) Niu
(74) *Attorney, Agent, or Firm* — Fogg & Powers LLC (57) ABSTRACT

Systems and methods for ring laser gyroscopes (RLGs) are provided. An RLG includes a traveling-wave resonator cavity with three or more mirrors and a gain medium positioned in the traveling-wave resonator cavity between two of the three or more mirrors. The gain medium is a solid-state gain medium or a nonlinear optical medium. The RLG further includes a first pump laser and a second pump laser to pump the gain medium in different directions and generate first and second lasing signals that traverse the traveling-wave resonator cavity in a opposite directions. The RLG further includes first and second photodetectors to measure levels of the first and second lasing signals. The RLG further includes at least one processor configured to adjust a power level of the first pump laser and/or a power level of the second pump laser based on the measured power levels of the first and second lasing signals.

20 Claims, 5 Drawing Sheets

(51) Int. Cl.
*H01S 3/083* (2006.01)
*H01S 3/094* (2006.01)
*H01S 3/13* (2006.01)

(56) References Cited

U.S. PATENT DOCUMENTS

| | | |
|---|---|---|
| 7,230,686 B1 | 6/2007 | Schwartz et al. |
| 7,319,513 B2 | 1/2008 | Schwartz et al. |
| 7,446,879 B2 | 11/2008 | Feugnet et al. |
| 7,474,406 B2 | 1/2009 | Feugnet et al. |
| 7,548,572 B2 | 6/2009 | Schwartz et al. |
| 7,589,841 B2 | 9/2009 | Schwartz et al. |
| 8,035,818 B2 | 10/2011 | Schwartz et al. |
| 8,301,407 B2 | 10/2012 | Gutty et al. |
| 8,379,216 B2 | 2/2013 | Schwartz et al. |
| 8,587,788 B2 | 11/2013 | Schwartz et al. |
| 10,371,523 B1 | 8/2019 | Shahriar et al. |
| 10,907,966 B2 | 2/2021 | Fritz et al. |
| 10,907,967 B1 | 2/2021 | Wu et al. |
| 2010/0123901 A1 | 5/2010 | Schwartz et al. |
| 2010/0257950 A1* | 10/2010 | Yang ............... G01C 19/66 74/5.6 A |
| 2010/0265513 A1 | 10/2010 | Schwartz et al. |
| 2011/0194119 A1 | 8/2011 | Schwartz et al. |
| 2011/0235047 A1 | 9/2011 | Gutty et al. |
| 2017/0307375 A1* | 10/2017 | Bowers ............... G01C 19/66 |
| 2020/0056888 A1 | 2/2020 | Johnson et al. |
| 2020/0056889 A1 | 2/2020 | Touchberry et al. |
| 2020/0059062 A1 | 2/2020 | Marta et al. |

OTHER PUBLICATIONS

Schwartz et al., "Solid-state ring laser gyro for aerospace applications", International Conference on Space Optics—ICSO 2012, Oct. 2012, pp. 1 through 4, ESA and CNES.
European Patent Office, "Extended European Search Report from EP Application No. 21185938.4", from Foreign Counterpart to U.S. Appl. No. 16/933,537, dated Nov. 16, 2021, pp. 1 through 5, Published: EP.

* cited by examiner

APPARATUS AND METHODS FOR STABLE BIDIRECTIONAL OUTPUT FROM RING LASER GYROSCOPE

BACKGROUND

Ring laser gyroscopes are used to measure rotation rates based on the Sagnac effect, which induces a frequency difference between the two counter-propagating optical modes in a bidirectional laser ring cavity undergoing a rotational motion. The value, proportional to the rotation rate, is typically measured through observing the beat frequency of the two counter-propagating modes. Ring laser gyroscopes typically use a gaseous gain medium (for example, a helium/neon mixture) that is pumped by high voltages applied to electrodes in a sealed glass tube. However, the gaseous nature of the amplifying medium is a source of technical complications because of the high gas purity required and premature wear during its use due to gas leakage and deterioration of the electrodes by the high voltages used.

The problems inherent with the gaseous state of the amplifying medium can generally be eliminated by using a solid-state gain medium. It is possible to produce a solid-state ring laser gyroscope using, for example, an amplifying medium based on neodymium-doped yttrium aluminum garnet (YAG) crystals instead of the helium/neon gas mixture, and optical pumping of the crystals is provided by diode lasers. It is also possible to use a semiconductor material, a crystalline matrix, or a glass doped with rare earth ions (for example, erbium, ytterbium, or the like) as an amplifying medium for a solid-state ring laser gyroscope. For ring laser gyroscopes utilizing a solid-state gain medium, it is difficult to observe the beat frequency and achieve stable emission of the two counter-propagating modes in the ring cavity due to the homogeneous character of the broadening of the gain curve of the solid-state media, which induces very strong inter-modal competition that leads to the mode with higher intensity tending to consume all the gain in the solid-state medium and suppress the intensity of the other counter-propagating mode. This major physical obstacle has greatly limited the development of solid-state ring laser gyroscopes.

To alleviate these problems, previous solutions attenuate the effects of the competition between counter-propagating modes by introducing optical loss differences into the cavity that depend on the direction of propagation of the optical mode and its intensity. The principle is to modulate the loss by a feedback device according to the difference in intensity between the two transmitted modes to favor the weaker mode to the detriment of the stronger mode, which leads to constantly adjusting the intensity of the two counter-propagating modes either to a common value or to a constant difference. The feedback device may be based on the combination of multiple optical devices that act on the polarization state of the optical modes, which may include a linear polarizer, a reciprocal rotator or a waveplate, and a nonreciprocal rotator. These feedback devices contain more optical components and encounter technical difficulties due to use of nonreciprocal optical paths for the counter-propagating modes.

SUMMARY

In an example, a ring laser gyroscope includes a traveling-wave resonator cavity comprising three or more mirrors and a gain medium positioned in the traveling-wave resonator cavity between two mirrors of the three or more mirrors. The gain medium is a solid-state gain medium or a nonlinear optical medium. The ring laser gyroscope further includes a first pump laser configured to pump the gain medium in a first direction and generate a first lasing signal that traverses the traveling-wave resonator cavity. The ring laser gyroscope further includes a second pump laser configured to pump the gain medium in a second direction and generate a second lasing signal that traverses the traveling-wave resonator cavity in a direction opposite the first lasing signal. The ring laser gyroscope further includes a first photodetector configured to measure a power level of the first lasing signal. The ring laser gyroscope further includes a second photodetector configured to measure a power level of the second lasing signal. The ring laser gyroscope further includes at least one processor configured to adjust a power level of the first pump laser and/or a power level of the second pump laser based on the measured power level of the first lasing signal and the measured power level of the second lasing signal.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The example ring laser gyroscopes described herein include at least one gain medium (solid-state gain medium or nonlinear optical medium) that is pumped in different directions using two or more pump lasers in order to produce the two counter-propagating optical modes in a bidirectional laser ring cavity. The ring laser gyroscopes further include photodetectors to measure the power level of the counter-propagating optical modes and a pump servo to control the power level of at least one of the pump lasers based on the measured power levels of the counter-propagating optical modes. In some examples, the power level of the pump lasers is adjusted to equalize the power level of the counter-propagating optical modes, which can include increasing and/or decreasing the power levels of the pump lasers depending on the desired operation of the ring laser gyroscope. By using multiple pump lasers and controlling the power level of the pump laser(s) in the manner described herein, the ring laser gyroscopes overcome the problems discussed above with respect to using a gaseous gain medium and with using nonreciprocal paths for solid-state ring laser gyroscopes.

Figure 1:
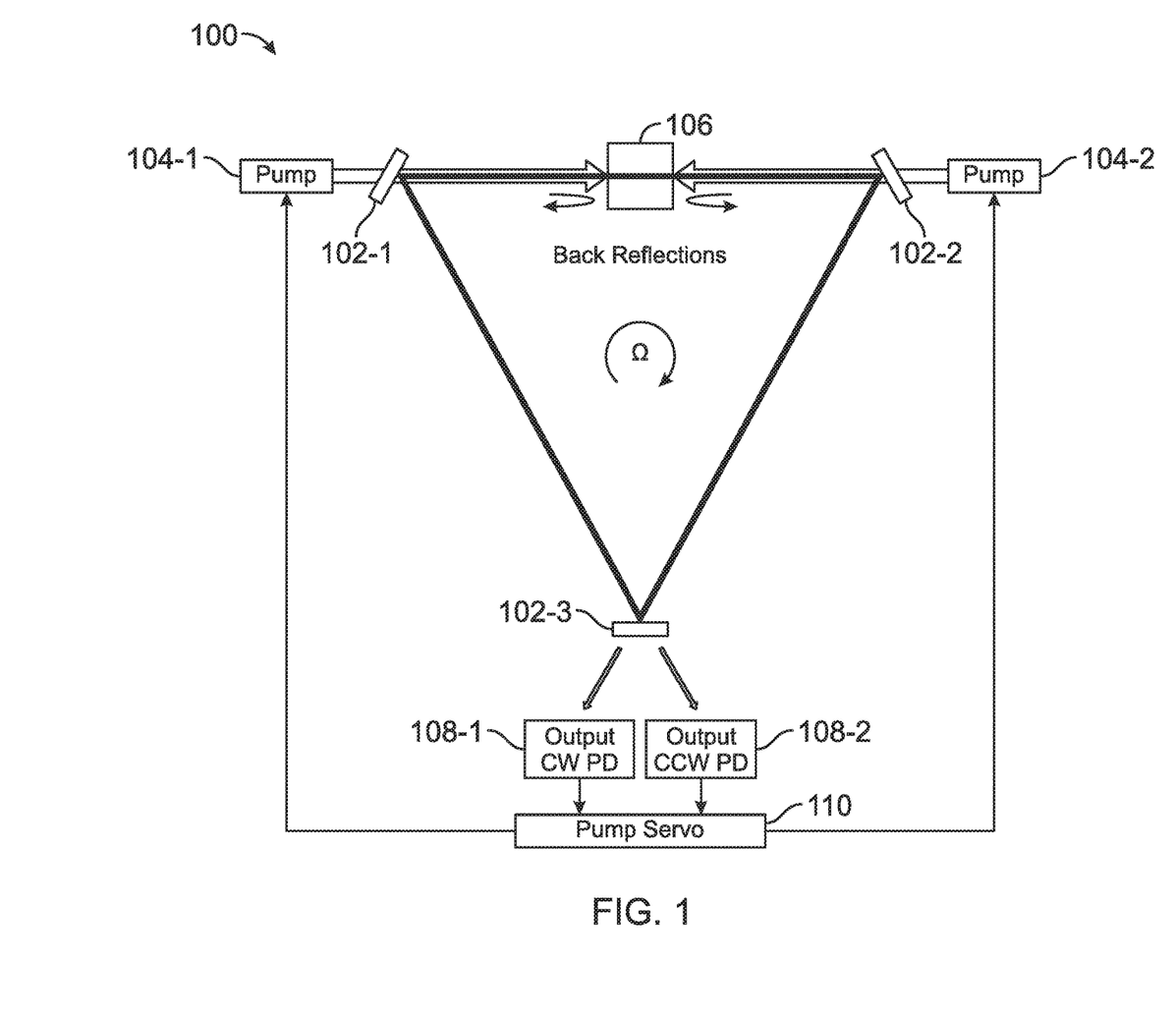
FIG. 1 is a block diagram of an example ring laser gyroscope.

FIG. 1 illustrates a block diagram of an example ring laser gyroscope 100. In the example shown in FIG. 1, the ring laser gyroscope 100 includes a traveling-wave resonator cavity (also referred to herein as "resonator cavity") having mirrors 102, pump lasers 104, a gain medium 106, photodetectors 108, and a pump servo 110. It should be understood that the ring laser gyroscope 100 shown in FIG. 1 could include additional features beyond those shown in FIG. 1. For example, the ring laser gyroscope 100 could include four mirrors, more than one gain medium, more than two pump lasers, etc.

In the example shown in FIG. 1, the ring laser gyroscope 100 includes three mirrors 102-1, 102-2, 102-3 in the resonator cavity. In some examples, the mirrors 102-1, 102-2, 102-3 are configured to reflect the lasing signals (also referred to as optical modes) that traverse the resonator cavity in multiple directions (for example, in clockwise and counterclockwise directions). In some examples, at least one of the mirrors 102-3 is configured to couple a small amount of light out of the resonator cavity such that the light can be measured. In some examples, two of the mirrors (for example, mirror 102-2 and mirror 102-3) are configured to couple a small amount of light out of the resonator cavity. In some such examples, the mirror 102-2 is configured to couple light out of the resonator in order for the lasing signals to be measured for rotation rate determination (not shown), and the mirror 102-3 is configured to couple light out of the resonator cavity in order for the power levels of the lasing signals to be measured for modifying the power levels of the pump lasers as discussed below.

In the example shown in FIG. 1, the ring laser gyroscope 100 includes a first pump laser 104-1 configured to pump the gain medium 106 in a first direction (clockwise (CW) direction), and a second pump laser 104-2 configured to pump the gain medium 106 in a second direction (counterclockwise (CCW) direction). In the example shown in FIG. 1, the mirror 102-1 is configured to couple the laser light from the first pump laser 104-1 into the resonator cavity, and the mirror 104-2 is configured to couple the laser light from the second pump laser 104-2 into the resonator cavity. In other examples, the pump lasers 104-1, 104-2 could be positioned differently and the laser light from the pump lasers 104-1, 104-2 could be coupled into the resonator cavity using different mirrors. In some examples, the wavelength of the first pump laser 104-1 and the second pump laser 104-2 are selected such that the gain medium 106 can absorb the light to excite the atoms in the gain medium 106 and induce lasing via population inversion. In other examples, the wavelength of the first pump laser 104-1 and the second pump laser 104-2 are selected such that the gain medium 106 can produce the lasing signals via nonlinear optical processes.

The gain medium 106 is positioned between two of the mirrors in the resonator cavity. In the example shown in FIG. 1, the gain medium 106 is positioned between mirror 102-1 and mirror 102-2. However, in other examples, the gain medium 106 can be positioned between different mirrors. It is not necessary that the gain medium is positioned between the first pump laser 104-1 and the second pump laser 104-2 as long as the gain medium 106 can be pumped in different directions.

In some examples, the gain medium 106 is a solid-state gain medium. In some such examples, the solid-state gain medium is glass doped with rare earth ions or a crystal doped with rare earth ions (for example, erbium, ytterbium, neodymium, or the like). The solid-state gain medium is configured to absorb the pump laser light in order to excite the atoms in the solid-state gain medium and induce lasing via population inversion. In the example shown in FIG. 1, such a solid-state gain medium is configured to absorb the pump laser light from the first pump laser 104-1 and the second pump laser 104-2 and generate lasing signals in the clockwise direction and counterclockwise direction.

In other examples, the gain medium 106 is a nonlinear optical medium (such as, for example, a nonlinear optical crystal). In such examples, the nonlinear optical medium is configured to transfer the pump laser power from the first pump laser 104-1 and the second pump laser 104-2 to lasing signals in the clockwise direction and counterclockwise direction through nonlinear optical processes. For example, the nonlinear optical medium may generate the lasing signals via optical parametric oscillation, stimulated scattering, or other nonlinear optical process. In some examples, the nonlinear optical medium is configured to generate the clockwise lasing signal from the pump laser signal from the first pump laser 104-1 and the counterclockwise lasing signal from the pump laser signal from the second pump laser 104-2. In other examples, the nonlinear optical medium is configured to generate the counterclockwise lasing signal from the pump laser signal from the first pump laser 104-1 and the clockwise lasing signal from the pump laser signal from the second pump laser 104-2.

In the example shown in FIG. 1, the ring laser gyroscope includes a first photodetector 108-1 configured to measure a power level of the first lasing signal (for example, the CW signal) and a second photodetector 108-2 configured to measure a power level of the second lasing signal (for example, the CCW signal). In the example shown in FIG. 1, the mirror 102-3 is configured to couple a small portion of both the first lasing signal and the second lasing signal to the respective photodetectors 108-1, 108-2. In other examples, a different mirror (for example, mirror 102-1 or mirror 102-2) can be used to couple small portions of both of the lasing signals to the photodetectors 108-1, 108-2. In some examples, the photodetectors 108-1, 108-2 are photodiodes. In some examples, one or more additional detectors (not shown) are included in the ring laser gyroscope 100 and configured to detect the beat frequency between the first lasing signal and the second lasing signal to determine rotation rate.

Figure 2A:
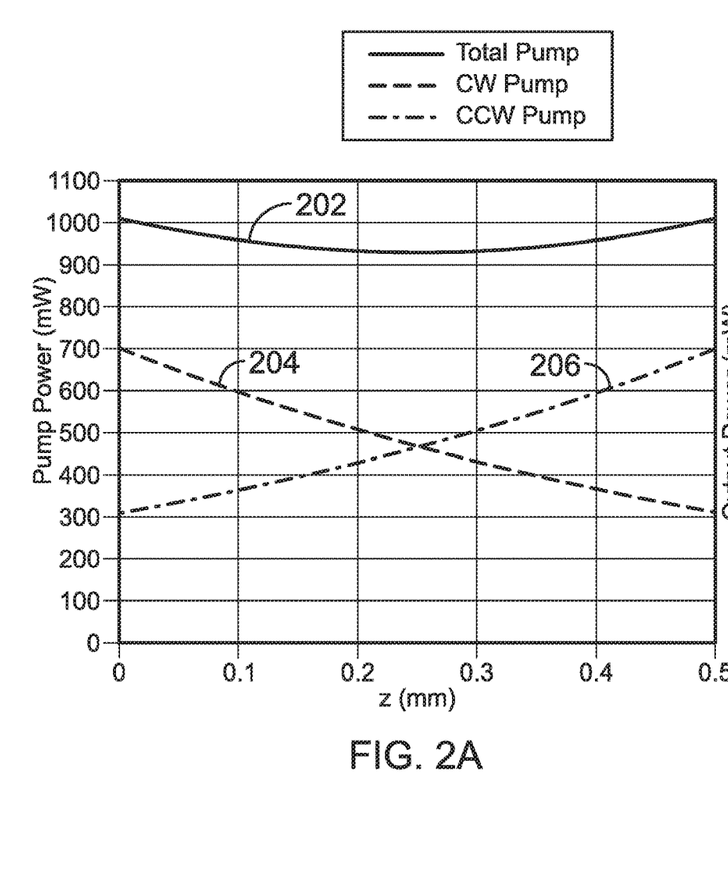
FIGS. 2A-2D are modeled graphical representations of the simulated pump power distribution and output power levels for lasing signals for various pump laser powers.
Figure 2B:
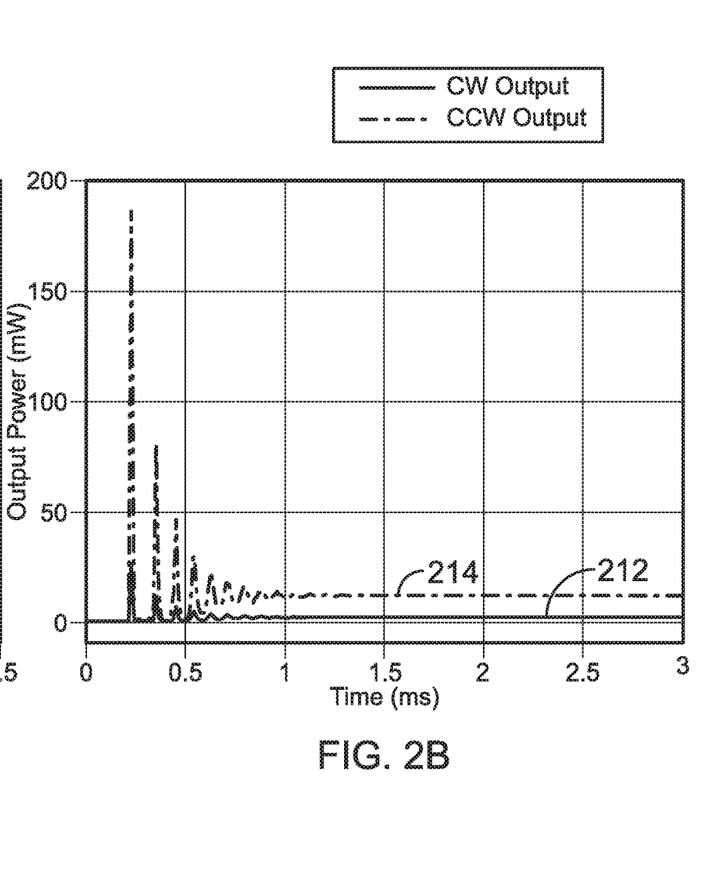
Figure 2C:
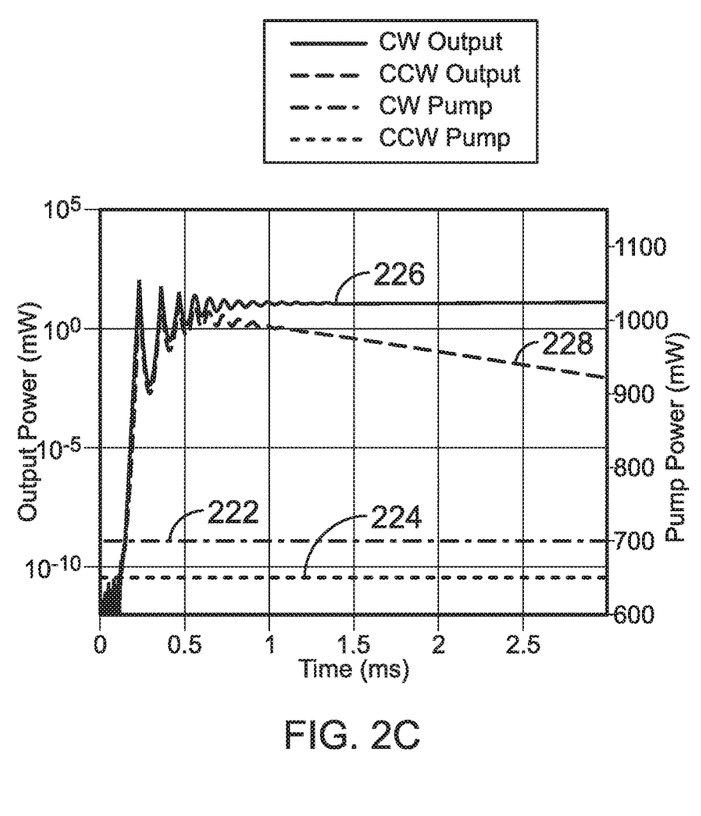
Figure 2D:
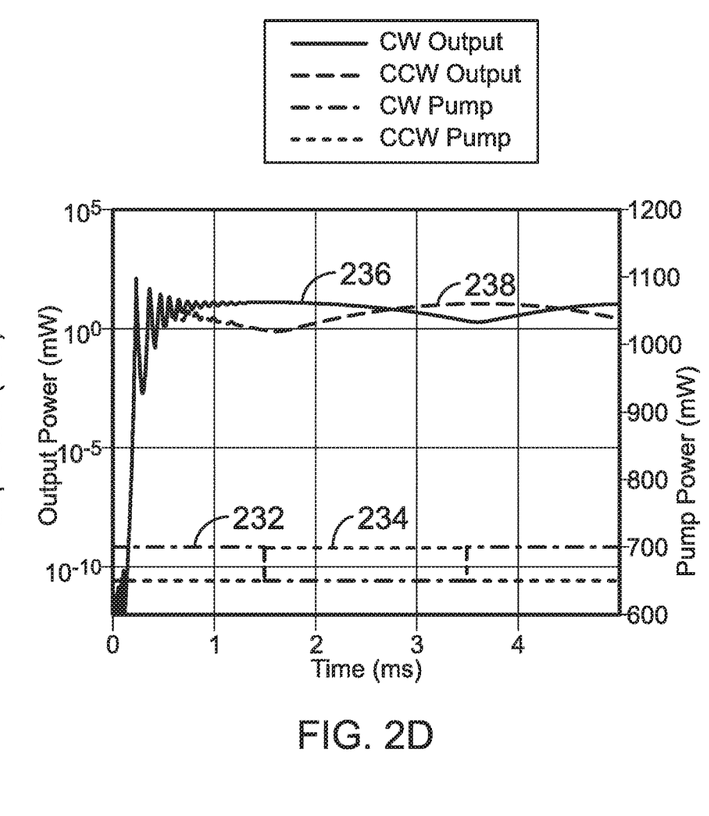

The performance of the ring laser gyroscope generally, and the output power levels of the first lasing signal and the second lasing signal specifically, can be improved by precisely setting the power level of the respective pump lasers that produce the lasing signals. FIG. 2A illustrates graphical representations of the simulated pump power distribution in a rare earth doped solid-state gain medium for particular pump laser power levels. FIG. 2B illustrates graphical representations of the corresponding simulated output power level of the respective lasing signals for the pump laser power levels and distribution shown in FIG. 2A. FIGS. 2C-2D illustrate graphical representations of time-varying pump laser power levels and the corresponding simulated output power level of the respective lasing signals for various time-varying pump laser power levels. The first pump laser 104-1 is referred to as the "CW Pump" and the second pump laser 104-2 is referred to as the "CCW Pump" in FIGS. 2A and 2C-2D. The output of the first lasing signal is referred to as the "CW Output" and the output of the second lasing signal as the "CCW Output" in FIGS. 2B-2D.

FIG. 2A illustrates a pump power distribution in a rare earth doped solid-state gain medium when the power level of the CW Pump and the power level of the CCW Pump are equal. In the example shown in FIG. 2A, the power level of the CW Pump and the power level of the CCW Pump are 700 mW at the entering surface of the gain medium. The line 202 shows the total pump power distribution in the solid-state gain medium. The line 204 shows the pump power distribution in the solid-state gain medium for the CW Pump (propagates from left to right) and the line 206 shows the pump power distribution in the solid-state gain medium for the CCW Pump (propagates from right to left). Because of the absorption by the gain medium, pump power decreases when propagating through the gain medium in each direction.

FIG. 2B illustrates the simulated output power level of the lasing signals produced using the pump power levels and distribution shown in FIG. 2A discussed above. In in FIG. 2B, the solid line 212 shows the simulated power level of the CW Output and the dotted line 214 shows the simulated power level of the CCW Output as a function of time after pump lasers are turned on at time zero. In the example shown in FIG. 2B, a few spikes of the output power shown before 1 milliseconds (ms) are due to relaxation oscillations during a laser power build up period. After this initial period of mode competition, power in one direction may gain advantage over the other direction. In the example shown in FIG. 2B, the power level of the CCW Output is significantly higher than the power level of the CW Output. However, in other examples, the CW Output power can be higher than the CCW Output due to the random nature of the mode competition even with the same pump condition shown in FIG. 2A. The example in FIG. 2B illustrates the common mode competition problem with a solid-state gain medium discussed above, which reduces the stability of the ring laser gyroscope. In particular, the lasing signal in one direction consumes most of the gain in the solid-state gain medium over time and suppresses the lasing signal in the counter-propagating direction.

FIG. 2C illustrates an example when the power level (indicated by the right axis in linear scale) of the CW Pump and the power level of the CCW Pump are not equal. In the example shown in FIG. 2C, the power level of the CW Pump at 700 mW is higher than the power level of the CCW Pump at 650 mW. The line 222 shows the pump power as a function of time launched to the solid-state gain medium for the CW Pump and the line 224 shows the pump power as a function of time launched to the solid-state gain medium for the CCW Pump.

FIG. 2C also illustrates the simulated output power level (indicated by the left axis in log scale) of the lasing signals produced using the pump power levels indicated by line 222 and 224 in FIG. 2C and discussed above. In the example shown in FIG. 2C, the line 226 shows the simulated power level of the CW Output and the line 228 shows the simulated power level of the CCW Output as a function of time after pump lasers are turned on at time zero. In the example shown in FIG. 2C, the power level of the CW Output and the power level of the CCW Output are different. Due to stronger pump power in the CW direction, the simulation shows that the power level of the CW Output gradually dominates over the CCW Output.

FIG. 2D illustrates an example when the power level (indicated by the right axis of the figure) of the CW Pump and the power level of the CCW Pump are changing over time. In the example shown in FIG. 2D, the line 232 shows the pump power as a function of time launched to the solid-state gain medium for the CW Pump and the line 234 shows the pump power as a function of time launched to the solid-state gain medium for the CCW Pump. Before 1.5 ms, the power level of the CW Pump is at 700 mW and the power level of the CCW Pump is at 650 mW. Due to higher gain in the CW direction, the CW Output increases and CCW Output decreases. Between 1.5 and 3.5 ms, the power level of the CW Pump is reduced to 650 mW and the power level of the CCW Pump is increased to 700 mW. This change of pump power level caused the CCW gain to be higher than CW gain over this time period, leading to gradual recovery of the CCW Output and decrease of the CW Output. At time of 3.5 ms, the power level of the CW Pump is changed from 650 mW to 700 mW and the power level of the CCW Pump is changed from 700 mW to 650 mW. This pump power change made the CW gain higher than CCW gain, which leads to gradual recovery of CW Output and decrease of CCW Output. This simulation example indicates that the signal output power can be controlled by pump power level adjustments.

Figure 3:
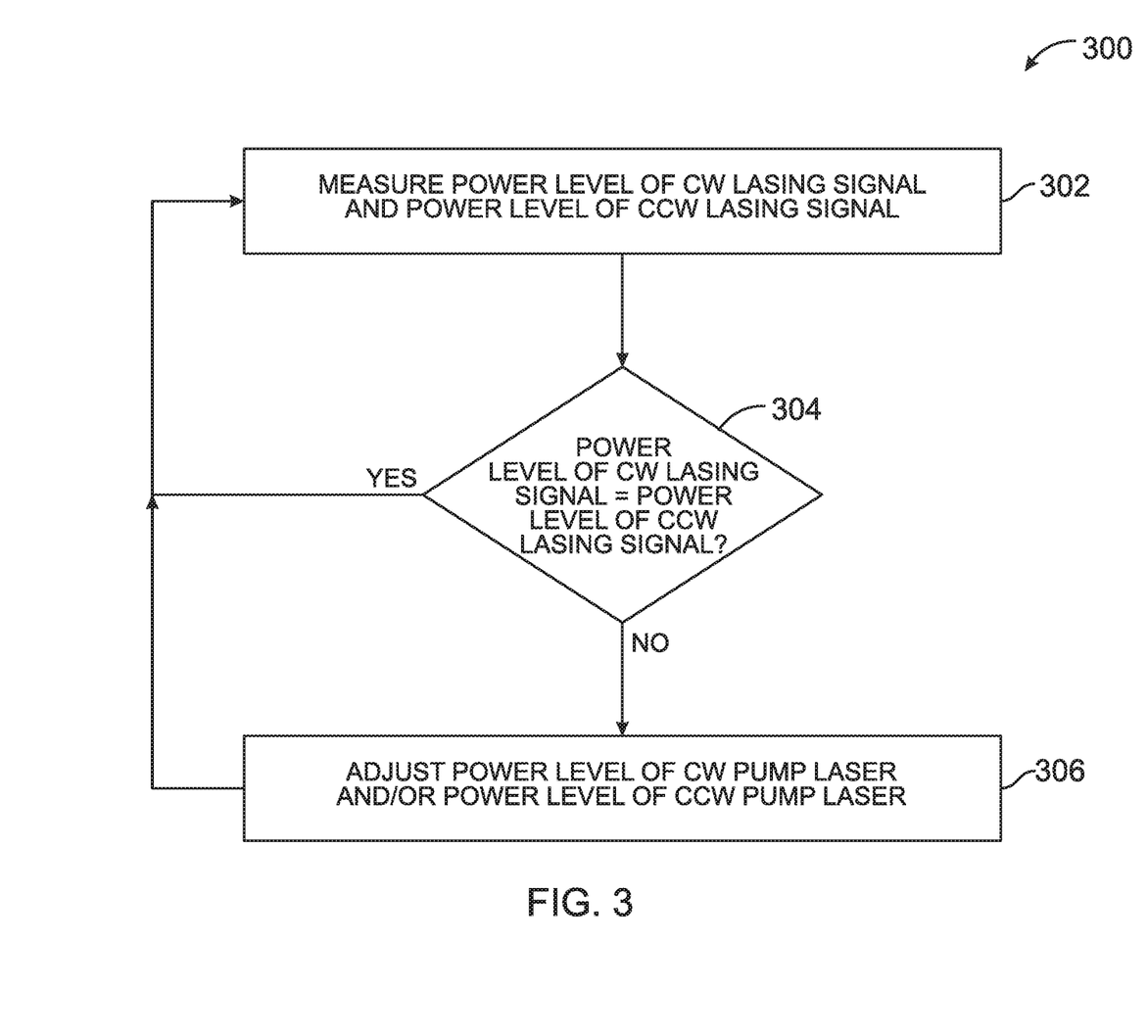
FIG. 3 is a flow diagram of an example method of operating a ring laser gyroscope.

In order to improve performance over time, the ring laser gyroscope 100 further includes a pump servo 110 configured to control the power level of the first pump laser 104-1 and/or the power level of the second pump laser 104-2 based on the measured power levels of the first lasing signal and the second lasing signal from the photodetectors, which is discussed in more detail with respect to FIG. 3. In the example shown in FIG. 1, a single pump servo 110 is coupled to both the first pump laser 104-1 and the second pump laser 104-2. However, it should be understood that a different number of pump servos (for example, two pump servos) could be used to respectively control the first pump laser 104-1 and the second pump laser 104-2.

FIG. 3 illustrates a flow diagram of an example method 300 of operating a ring laser gyroscope. The functions, structures, and other description of liked-named elements for such examples described herein may apply to like-named elements described with reference to method 300 and vice versa.

The method 300 includes measuring the power level of the CW lasing signal and the power level of the CCW lasing signal (block 302). In some examples, the power level of the CW lasing signal and the power level of the CCW lasing signal is measured using respective photodetectors (for example, photodiodes) configured to receive a portion of the respective lasing signal output from a mirror in the resonator cavity of the ring laser gyroscope. In some examples, the power levels of the CW lasing signal and the CCW lasing signal are measured at a predetermined time interval (for example, every 0.5 ms). In some examples, the power levels of the CW lasing signal and the CCW lasing signal are continuously measured.

The method 300 further includes determining whether the measured power level of the CW lasing signal is approximately equal to the measured power level of the CCW lasing signal (block 304). In some examples, the determination for block 304 is made by a pump servo (for example, pump servo 110 shown in FIG. 1).

When the measured power level of the CW lasing signal is approximately equal to the measured power level of the CCW lasing signal, the method 300 proceeds to block 302 with measuring the power level of the CW lasing signal and the CCW lasing signal at a later time.

When the measured power level of the CW lasing signal is not approximately equal to the measured power level of the CCW lasing signal, the method 300 proceeds with adjusting the power level of the CW pump laser and/or the power level of the CCW pump laser based on the measured power levels of the CW lasing signal and the CCW lasing signal (block 306). In some examples, the power level of the CW pump laser and/or the power level of the CCW pump laser is adjusted using a servo (for example, pump servo 110 shown in FIG. 1).

In some examples, the CW lasing signal is generated by the CW pump laser and the CCW lasing signal is generated by the CCW pump laser. In some such examples, when the measured power level of the CW lasing signal is greater than the measured power level of the CCW lasing signal, the pump servo is configured to increase the power level of the CCW pump laser without adjusting the power level of the CW pump laser. In other such examples, when the measured power level of the CW lasing signal is greater than the measured power level of the CCW lasing signal, the pump servo is configured to decrease the power level of the CW pump laser without adjusting the power level of the CCW pump laser. In other such examples, when the measured power level of the CW lasing signal is greater than the measured power level of the CCW lasing signal, the pump servo is configured to increase the power level of the CCW pump laser and decrease the power level of the CW pump laser.

In some examples, the CW lasing signal is generated by the CW pump laser and the CCW lasing signal is generated by the CCW pump laser. In some such examples, when the measured power level of the CCW lasing signal is greater than the measured power level of the CW lasing signal, the pump servo is configured to increase the power level of the CW pump laser without adjusting the power level of the CCW pump laser. In other such examples, when the measured power level of the CCW lasing signal is greater than the measured power level of the CW lasing signal, the pump servo is configured to decrease the power level of the CCW pump laser without adjusting the power level of the CW pump laser. In other such examples, when the measured power level of the CCW lasing signal is greater than the measured power level of the CW lasing signal, the pump servo is configured to increase the power level of the CW pump laser and decrease the power level of the CCW pump laser.

In some examples, when the gain medium is a nonlinear optical medium, the CW lasing signal is generated by the CCW pump laser and the CCW lasing signal is generated by the CW pump laser. In some such examples, when the measured power level of the CW lasing signal is greater than the measured power level of the CCW lasing signal, the pump servo is configured to increase the power level of the CW pump laser without adjusting the power level of the CCW pump laser. In other such examples, when the measured power level of the CW lasing signal is greater than the measured power level of the CCW lasing signal, the pump servo is configured to decrease the power level of the CCW pump laser without adjusting the power level of the CW pump laser. In other such examples, when the measured power level of the CW lasing signal is greater than the measured power level of the CCW lasing signal, the pump servo is configured to increase the power level of the CW pump laser and decrease the power level of the CCW pump laser.

In some examples, when the gain medium is a nonlinear optical medium, the CW lasing signal is generated by the CCW pump laser and the CCW lasing signal is generated by the CW pump laser. In some such examples, when the measured power level of the CCW lasing signal is greater than the measured power level of the CW lasing signal, the pump servo is configured to increase the power level of the CCW pump laser without adjusting the power level of the CW pump laser. In other such examples, when the measured power level of the CCW lasing signal is greater than the measured power level of the CW lasing signal, the pump servo is configured to decrease the power level of the CW pump laser without adjusting the power level of the CCW pump laser. In other such examples, when the measured power level of the CCW lasing signal is greater than the measured power level of the CW lasing signal, the pump servo is configured to increase the power level of the CCW pump laser and decrease the power level of the CW pump laser.

Figure 4:
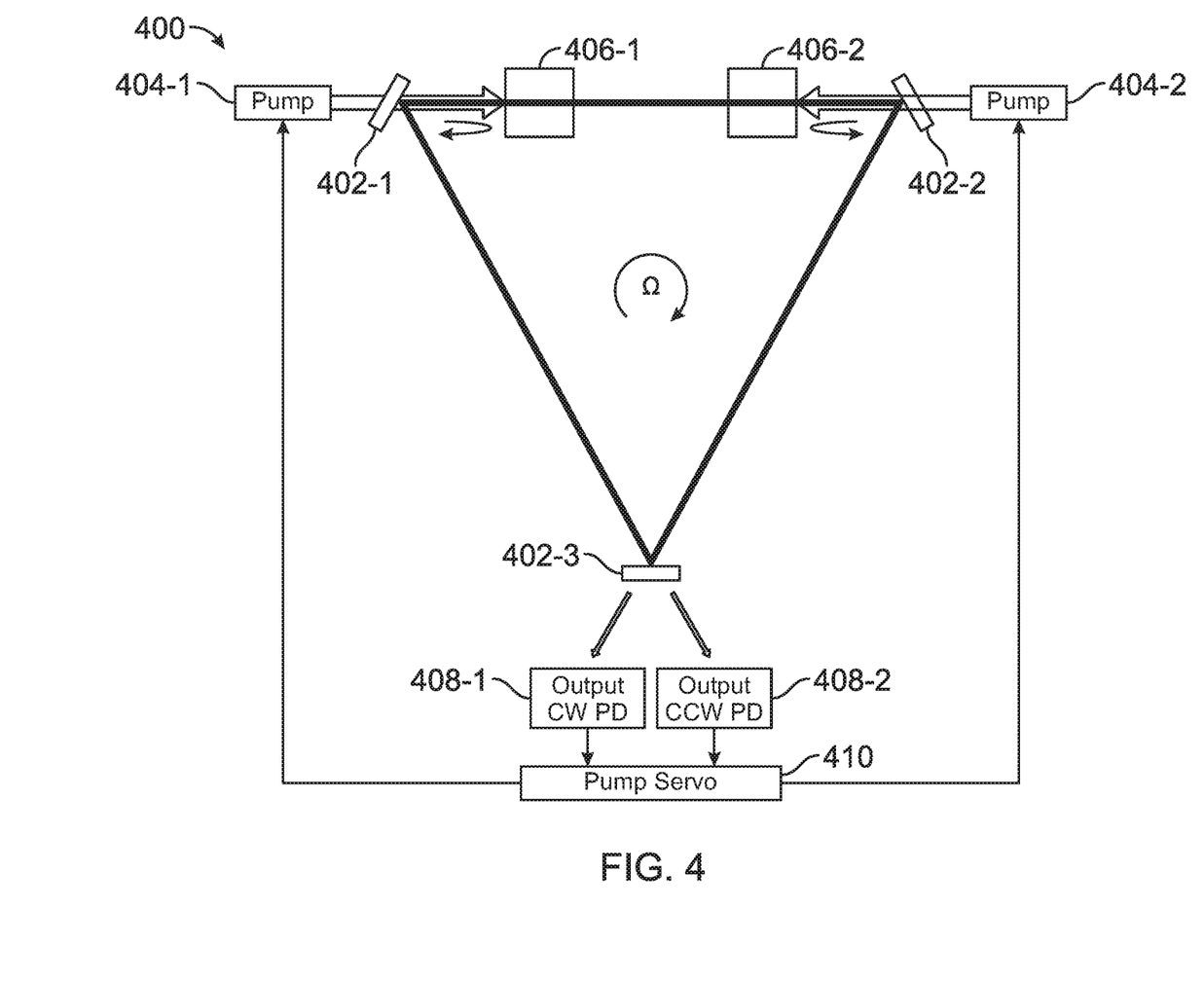
FIG. 4 is a block diagram of an example ring laser gyroscope.

FIG. 4 illustrates a block diagram of an example ring laser gyroscope 400. In the example shown in FIG. 4, the ring laser gyroscope 400 includes a traveling-wave resonator cavity (also referred to as a "resonator cavity") having mirrors 402, pump lasers 404, two gain mediums 406, photodetectors 408, and a pump servo 410. It should be understood that the ring laser gyroscope 400 shown in FIG. 4 could include additional features beyond those shown in FIG. 4. For example, the ring laser gyroscope 400 could include four mirrors, more than two gain mediums, more than two pump lasers, etc.

In the example shown in FIG. 4, the ring laser gyroscope 400 includes three mirrors 402-1, 402-2, 402-3 in the resonator cavity. In some examples, the mirrors 402-1, 402-2, 402-3 are configured to reflect the lasing signals that traverse the resonator cavity in multiple directions (for example, clockwise and counterclockwise directions). In some examples, at least one of the mirrors 402-3 is configured to couple a small amount of light out of the resonator cavity such that the light can be measured. In some examples, two of the mirrors (for example, mirror 402-2 and mirror 402-3) are configured to couple a small amount of light out of the resonator cavity. In some such examples, the mirror 402-2 is configured to couple light out of the resonator in order for the lasing signals to be measured for rotation rate determination, and the mirror 402-3 is configured to couple light out of the resonator cavity in order for the power levels of the lasing signals to be measured for modifying the pump laser power as discussed below.

In the example shown in FIG. 4, the ring laser gyroscope 400 includes a first pump laser 404-1 configured to pump the first gain medium 406-1 in a first direction (for example, a clockwise (CW) direction). In the example shown in FIG. 4, the ring laser gyroscope 400 further includes a second pump laser 404-2 configured to pump the second gain medium 406-2 in a second direction (for example, a counterclockwise (CCW) direction). In the example shown in FIG. 4, the mirror 402-1 is configured to couple the laser light from the first pump laser 404-1 into the resonator cavity, and the mirror 404-2 is configured to couple the laser light from the second pump laser 404-2 into the resonator cavity. In other examples, the pump lasers 404-1, 404-2 could be positioned differently and the laser light from the pump lasers 404-1, 404-2 could be coupled into the resonator cavity using different mirrors. In some examples, the wavelength of the first pump laser 404-1 and the second pump laser 404-2 are selected such that the gain mediums 406-1, 406-2 can absorb the light to excite the atoms in the gain mediums 406-1, 406-2 and induce lasing via population inversion. In other examples, the wavelength of the first pump laser 404-1 and the second pump laser 404-2 are selected such that the gain mediums 406-1, 406-2 can produce the lasing signals via nonlinear optical processes.

The gain mediums 406 are positioned between two of the mirrors in the resonator cavity. In the example shown in FIG. 4, the gain mediums 406-1, 406-2 are both positioned between mirror 402-1 and mirror 402-2. However, in other examples, the gain mediums 406-1, 406-2 can both be positioned between different mirrors or the gain-medium 406-1 can be positioned between different mirrors than the gain medium 406-2. It is not necessary that the gain mediums be positioned between the first pump laser 404-1 and the second pump laser 404-2 as long as at least one of the gain mediums can be pumped in each direction.

In some examples, the gain mediums 406-1, 406-2 are both solid-state gain mediums. In some such examples, the solid-state gain mediums are glass doped with rare earth ions or a crystal doped with rare earth ions (for example, erbium, ytterbium, neodymium, or the like). The solid-state gain mediums are configured to absorb the pump laser light in order to excite the atoms in the solid-state gain mediums and induce lasing via population inversion. In the example shown in FIG. 4, such a solid-state gain medium 406-1 is configured to absorb the pump laser light from the first pump laser 404-1 and a solid-state gain medium 406-2 is configured to absorb the pump laser light from the second pump laser 104-2.

In other examples, the gain mediums 406-1, 406-2 are nonlinear optical mediums. In such examples, the nonlinear optical mediums are configured to transfer the pump laser power from the first pump laser 404-1 and the second pump laser 404-2 to lasing signals in the clockwise direction and counterclockwise direction through nonlinear optical processes. For example, the nonlinear optical mediums may generate the lasing signals via optical parametric oscillation, stimulated scattering, or other nonlinear optical process. In some examples of the ring laser gyroscope 400 shown in FIG. 4, the nonlinear optical medium 406-1 can be configured to generate the clockwise lasing signal from the pump laser signal from the first pump laser 404-1, and the nonlinear optical medium 406-2 can be configured to generate the counterclockwise lasing signal from the pump laser signal from the second pump laser 404-2. In other examples of the ring laser gyroscope 400 shown in FIG. 4, the nonlinear optical medium 406-1 is configured to generate the counterclockwise lasing signal from the pump laser signal from the first pump laser 404-1, and the nonlinear optical medium 406-2 is configured to generate the clockwise lasing signal from the pump laser signal from the second pump laser 404-2.

In the example shown in FIG. 4, the ring laser gyroscope 400 includes a first photodetector 408-1 configured to measure a power level of the first lasing signal (for example, the CW signal) and a second photodetector 408-2 configured to measure a power level of the second lasing signal (for example, the CCW signal). In the example shown in FIG. 4, the mirror 402-3 is configured to couple a small portion of both the first lasing signal and the second lasing signal to the respective photodetectors 408-1, 408-2. In other examples, a different mirror (for example, mirror 402-1 or mirror 402-2) can be used to couple small portions of both of the lasing signals to the photodetectors 408-1, 408-2. In some examples, the photodetectors 408-1, 408-2 are photodiodes. In some examples, one or more additional detectors (not shown) are included in the ring laser gyroscope 400 and configured to detect the beat frequency between the first lasing signal and the second lasing signal to determine rotation rate.

In order to improve performance over time, the ring laser gyroscope 400 further includes a pump servo 410 configured to control the power levels of the first pump laser 404-1 and/or the power level of the second pump laser 404-2 based on the measured power levels of the first lasing signal and the second lasing signal from the photodetectors 408-1, 408-2. In some examples, the pump servo 410 operates in a similar manner to that discussed with respect to FIG. 3. In the example shown in FIG. 4, a single pump servo 410 is coupled to both the first pump laser 404-1 and the second pump laser 404-2. However, it should be understood that a different number of pump servos (for example, two pump servos) could be used to respectively control the first pump laser 404-1 and the second pump laser 404-2.

The ring laser gyroscopes described herein can utilize a solid-state gain medium or nonlinear optical medium rather than a gaseous medium to produce the lasing signals, which increases the lifespan of the ring laser gyroscopes. Also, the ring laser gyroscopes described herein solve the mode competition issues for solid-state gain mediums with fewer optical components and without using nonreciprocal paths, which can reduce the size of the ring laser gyroscope while improving performance compared to previous solutions.

In various aspects, system elements, method steps, or examples described throughout this disclosure (such as the pump servo 110, 410, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used for synchronization and fault management in a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Example Embodiments

Example 1 includes a ring laser gyroscope, comprising: a traveling-wave resonator cavity comprising three or more mirrors; a gain medium positioned in the traveling-wave resonator cavity between two mirrors of the three or more mirrors, wherein the gain medium is a solid-state gain medium or a nonlinear optical medium; a first pump laser configured to pump the gain medium in a first direction and generate a first lasing signal that traverses the traveling-wave resonator cavity; a second pump laser configured to pump the gain medium in a second direction and generate a second lasing signal that traverses the traveling-wave resonator cavity in a direction opposite the first lasing signal; a first photodetector configured to measure a power level of the first lasing signal; a second photodetector configured to measure a power level of the second lasing signal; and at least one processor configured to adjust a power level of the first pump laser and/or a power level of the second pump laser based on the measured power level of the first lasing signal and the measured power level of the second lasing signal.

Example 2 includes the ring laser gyroscope of Example 1, wherein the at least one processor is further configured to compare the measured power level of the first lasing signal and the measured power level of the second lasing signal.

Example 3 includes the ring laser gyroscope of Example 2, wherein the at least one processor is further configured to: increase the power level of the first pump laser in response to the measured power level of the first lasing signal being less than the measure level of the second lasing signal; and increase the power level of the second pump laser in response to the measured power level of the second lasing signal being less than the measure level of the first lasing signal.

Example 4 includes the ring laser gyroscope of Example 2, wherein the at least one processor is further configured to: decrease the power level of the second pump laser in response to the measured power level of the first lasing signal being less than the measure level of the second lasing signal; and decrease the power level of the first pump laser in response to the measured power level of the second lasing signal being less than the measure level of the first lasing signal.

Example 5 includes the ring laser gyroscope of Example 2, wherein the at least one processor is further configured to: increase the power level of the first pump laser and decrease the power level of the second pump laser in response to the measured power level of the first lasing signal being less than the measure level of the second lasing signal; and increase the power level of the second pump laser and decrease the power level of the first pump laser in response to the measured power level of the second lasing signal being less than the measure level of the first lasing signal.

Example 6 includes the ring laser gyroscope of any of Examples 1-5, wherein the gain medium is a solid-state gain medium, wherein the solid-state gain medium comprises glass doped with rare earth ions or a crystal doped with rare earth ions.

Example 7 includes the ring laser gyroscope of any of Examples 1-5, wherein the gain medium is a nonlinear optical medium.

Example 8 includes the ring laser gyroscope of Example 7, wherein the at least one processor is further configured to compare the measured power level of the first lasing signal and the measured power level of the second lasing signal, wherein the at least one processor is further configured to: increase the power level of the second pump laser in response to the measured power level of the first lasing signal being less than the measure level of the second lasing signal; and increase the power level of the first pump laser in response to the measured power level of the second lasing signal being less than the measure level of the first lasing signal.

Example 9 includes a ring laser gyroscope, comprising: a traveling-wave resonator cavity comprising three or more mirrors; a first gain medium positioned in the traveling-wave resonator cavity between two mirrors of the three or more mirrors, wherein the first gain medium is a solid-state gain medium or a nonlinear optical medium; a second gain medium positioned in the traveling-wave resonator cavity between two mirrors of the three or more mirrors, wherein the second gain medium is a solid-state gain medium or a nonlinear optical medium; a first pump laser configured to pump the first gain medium in a first direction and generate a first lasing signal that traverses the traveling-wave resonator cavity; a second pump laser configured to pump the second gain medium in a second direction and generate a second lasing signal that traverses the traveling-wave resonator cavity in a direction opposite the first lasing signal; a first photodetector configured to measure a power level of the first lasing signal; a second photodetector configured to measure a power level of the second lasing signal; and at least one processor configured to adjust a power level of the first pump laser and/or a power level of the second pump laser based on the measured power level of the first lasing signal and the second lasing signal.

Example 10 includes the ring laser gyroscope of Example 9, wherein the at least one processor is further configured to compare the measured power level of the first lasing signal and the measured power level of the second lasing signal.

Example 11 includes the ring laser gyroscope of Example 10, wherein the at least one processor is further configured to: increase the power level of the first pump laser in response to the measured power level of the first lasing signal being less than the measure level of the second lasing signal; and increase the power level of the second pump laser in response to the measured power level of the second lasing signal being less than the measure level of the first lasing signal.

Example 12 includes the ring laser gyroscope of Example 10, wherein the at least one processor is further configured to: decrease the power level of the second pump laser in response to the measured power level of the first lasing signal being less than the measure level of the second lasing signal; and decrease the power level of the first pump laser in response to the measured power level of the second lasing signal being less than the measure level of the first lasing signal.

Example 13 includes the ring laser gyroscope of Example 10, wherein the at least one processor is further configured to: increase the power level of the first pump laser and decrease the power level of the second pump laser in response to the measured power level of the first lasing signal being less than the measure level of the second lasing signal; and increase the power level of the second pump laser and decrease the power level of the first pump laser in response to the measured power level of the second lasing signal being less than the measure level of the first lasing signal.

Example 14 includes the ring laser gyroscope of any of Examples 9-13, wherein the first gain medium is a solid-state gain medium and the second gain medium is a solid-state gain medium, wherein a solid-state gain medium comprises glass doped with rare earth ions or a crystal doped with rare earth ions.

Example 15 includes the ring laser gyroscope of any of Examples 9-13, wherein the first gain medium is a nonlinear optical medium and the second gain medium is a nonlinear optical medium.

Example 16 includes the ring laser gyroscope of Example 15, wherein the at least one processor is further configured to compare the measured power level of the first lasing signal and the measured power level of the second lasing signal, wherein the at least one processor is further configured to: increase the power level of the second pump laser in response to the measured power level of the first lasing signal being less than the measure level of the second lasing signal; and increase the power level of the first pump laser in response to the measured power level of the second lasing signal being less than the measure level of the first lasing signal.

Example 17 includes a ring laser gyroscope, comprising: a traveling-wave resonator cavity comprising three or more mirrors; a solid-state gain medium positioned in the traveling-wave resonator cavity between two mirrors of the three or more mirrors; a first pump laser configured to pump the solid-state gain medium in a first direction and generate a first lasing signal that traverses the traveling-wave resonator cavity in the first direction; a second pump laser configured to pump the solid-state gain medium in a second direction opposite the first direction and generate a second lasing signal that traverses the traveling-wave resonator cavity in the second direction; a first photodetector configured to measure a power level of the first lasing signal; a second photodetector configured to measure a power level of the second lasing signal; and at least one processor configured to compare the measured power level of the first lasing signal and the measured power level of the second lasing signal and adjust a power level of the first pump laser and/or a power level of the second pump laser based on a comparison of the measured power level of the first lasing signal and the measured power level of the second lasing signal.

Example 18 includes the ring laser gyroscope of Example 17, wherein the at least one processor is further configured to: increase the power level of the first pump laser in response to the measured power level of the first lasing signal being less than the measure level of the second lasing signal; and increase the power level of the second pump laser in response to the measured power level of the second lasing signal being less than the measure level of the first lasing signal.

Example 19 includes the ring laser gyroscope of Example 17, wherein the at least one processor is further configured to: decrease the power level of the second pump laser in response to the measured power level of the first lasing signal being less than the measure level of the second lasing signal; and decrease the power level of the first pump laser in response to the measured power level of the second lasing signal being less than the measure level of the first lasing signal.

Example 20 includes the ring laser gyroscope of Example 17, wherein the at least one processor is further configured to: increase the power level of the first pump laser and decrease the power level of the second pump laser in response to the measured power level of the first lasing signal being less than the measure level of the second lasing signal; and increase the power level of the second pump laser and decrease the power level of the first pump laser in response to the measured power level of the second lasing signal being less than the measure level of the first lasing signal.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof

What is claimed is:

1. A ring laser gyroscope, comprising:
  a traveling-wave resonator cavity comprising three or more mirrors;
  a gain medium positioned in the traveling-wave resonator cavity between two mirrors of the three or more mirrors, wherein the gain medium is a solid-state gain medium or a nonlinear optical medium;
  a first pump laser configured to pump the gain medium in a first direction, wherein pumping of the gain medium by the first pump laser generates a first lasing signal that traverses the traveling-wave resonator cavity;
  a second pump laser configured to pump the gain medium in a second direction, wherein pumping of the gain medium by the second pump laser generates a second lasing signal that traverses the traveling-wave resonator cavity in a direction opposite the first lasing signal;
  a first photodetector configured to measure a power level of the first lasing signal;
  a second photodetector configured to measure a power level of the second lasing signal; and
  at least one processor configured to adjust a power level of the first pump laser and/or a power level of the second pump laser based on the measured power level of the first lasing signal and the measured power level of the second lasing signal.

2. The ring laser gyroscope of claim 1, wherein the at least one processor is further configured to compare the measured power level of the first lasing signal and the measured power level of the second lasing signal.

3. The ring laser gyroscope of claim 2, wherein the at least one processor is further configured to:

increase the power level of the first pump laser in response to the measured power level of the first lasing signal being less than the measure level of the second lasing signal; and increase the power level of the second pump laser in response to the measured power level of the second lasing signal being less than the measure level of the first lasing signal.

4. The ring laser gyroscope of claim 2, wherein the at least one processor is further configured to:

decrease the power level of the second pump laser in response to the measured power level of the first lasing signal being less than the measure level of the second lasing signal; and decrease the power level of the first pump laser in response to the measured power level of the second lasing signal being less than the measure level of the first lasing signal.

5. The ring laser gyroscope of claim 2, wherein the at least one processor is further configured to:

increase the power level of the first pump laser and decrease the power level of the second pump laser in response to the measured power level of the first lasing signal being less than the measure level of the second lasing signal; and increase the power level of the second pump laser and decrease the power level of the first pump laser in response to the measured power level of the second lasing signal being less than the measure level of the first lasing signal.

6. The ring laser gyroscope of claim 1, wherein the gain medium is a solid-state gain medium, wherein the solid-state gain medium comprises glass doped with rare earth ions or a crystal doped with rare earth ions.

7. The ring laser gyroscope of claim 1, wherein the gain medium is a nonlinear optical medium.

8. The ring laser gyroscope of claim 7, wherein the at least one processor is further configured to compare the measured power level of the first lasing signal and the measured power level of the second lasing signal, wherein the at least one processor is further configured to:

increase the power level of the second pump laser in response to the measured power level of the first lasing signal being less than the measure level of the second lasing signal; and increase the power level of the first pump laser in response to the measured power level of the second lasing signal being less than the measure level of the first lasing signal.

9. A ring laser gyroscope, comprising:
a traveling-wave resonator cavity comprising three or more mirrors;
a first gain medium positioned in the traveling-wave resonator cavity between two mirrors of the three or more mirrors, wherein the first gain medium is a solid-state gain medium or a nonlinear optical medium;
a second gain medium positioned in the traveling-wave resonator cavity between two mirrors of the three or more mirrors, wherein the second gain medium is a solid-state gain medium or a nonlinear optical medium;
a first pump laser configured to pump the first gain medium in a first direction and generate a first lasing signal that traverses the traveling-wave resonator cavity;
a second pump laser configured to pump the second gain medium in a second direction and generate a second lasing signal that traverses the traveling-wave resonator cavity in a direction opposite the first lasing signal;
a first photodetector configured to measure a power level of the first lasing signal;
a second photodetector configured to measure a power level of the second lasing signal; and
at least one processor configured to adjust a power level of the first pump laser and/or a power level of the second pump laser based on the measured power level of the first lasing signal and the second lasing signal.

10. The ring laser gyroscope of claim 9, wherein the at least one processor is further configured to compare the measured power level of the first lasing signal and the measured power level of the second lasing signal.

11. The ring laser gyroscope of claim 10, wherein the at least one processor is further configured to:

increase the power level of the first pump laser in response to the measured power level of the first lasing signal being less than the measure level of the second lasing signal; and increase the power level of the second pump laser in response to the measured power level of the second lasing signal being less than the measure level of the first lasing signal.

12. The ring laser gyroscope of claim 10, wherein the at least one processor is further configured to:

decrease the power level of the second pump laser in response to the measured power level of the first lasing signal being less than the measure level of the second lasing signal; and decrease the power level of the first pump laser in response to the measured power level of the second lasing signal being less than the measure level of the first lasing signal.

13. The ring laser gyroscope of claim 10, wherein the at least one processor is further configured to:

increase the power level of the first pump laser and decrease the power level of the second pump laser in response to the measured power level of the first lasing signal being less than the measure level of the second lasing signal; and increase the power level of the second pump laser and decrease the power level of the first pump laser in response to the measured power level of the second lasing signal being less than the measure level of the first lasing signal.

14. The ring laser gyroscope of claim 9, wherein the first gain medium is a solid-state gain medium and the second gain medium is a solid-state gain medium, wherein a solid-state gain medium comprises glass doped with rare earth ions or a crystal doped with rare earth ions.

15. The ring laser gyroscope of claim 9, wherein the first gain medium is a nonlinear optical medium and the second gain medium is a nonlinear optical medium.

16. The ring laser gyroscope of claim 15, wherein the at least one processor is further configured to compare the measured power level of the first lasing signal and the measured power level of the second lasing signal, wherein the at least one processor is further configured to:

increase the power level of the second pump laser in response to the measured power level of the first lasing signal being less than the measure level of the second lasing signal; and increase the power level of the first pump laser in response to the measured power level of the second lasing signal being less than the measure level of the first lasing signal.

17. A ring laser gyroscope, comprising:
- a traveling-wave resonator cavity comprising three or more mirrors;
- a solid-state gain medium positioned in the traveling-wave resonator cavity between two mirrors of the three or more mirrors;
- a first pump laser configured to pump the solid-state gain medium in a first direction, wherein pumping of the solid-state gain medium by the first pump laser generates a first lasing signal that traverses the traveling-wave resonator cavity in the first direction;
- a second pump laser configured to pump the solid-state gain medium in a second direction opposite the first direction, wherein pumping of the solid-state gain medium by the second pump laser generates a second lasing signal that traverses the traveling-wave resonator cavity in the second direction;
- a first photodetector configured to measure a power level of the first lasing signal;
- a second photodetector configured to measure a power level of the second lasing signal; and
- at least one processor configured to compare the measured power level of the first lasing signal and the measured power level of the second lasing signal and adjust a power level of the first pump laser and/or a power level of the second pump laser based on a comparison of the measured power level of the first lasing signal and the measured power level of the second lasing signal.

18. The ring laser gyroscope of claim 17, wherein the at least one processor is further configured to:
- increase the power level of the first pump laser in response to the measured power level of the first lasing signal being less than the measure level of the second lasing signal; and
- increase the power level of the second pump laser in response to the measured power level of the second lasing signal being less than the measure level of the first lasing signal.

19. The ring laser gyroscope of claim 17, wherein the at least one processor is further configured to:
- decrease the power level of the second pump laser in response to the measured power level of the first lasing signal being less than the measure level of the second lasing signal; and
- decrease the power level of the first pump laser in response to the measured power level of the second lasing signal being less than the measure level of the first lasing signal.

20. The ring laser gyroscope of claim 17, wherein the at least one processor is further configured to:
- increase the power level of the first pump laser and decrease the power level of the second pump laser in response to the measured power level of the first lasing signal being less than the measure level of the second lasing signal; and
- increase the power level of the second pump laser and decrease the power level of the first pump laser in response to the measured power level of the second lasing signal being less than the measure level of the first lasing signal.

* * * * *